(12) United States Patent
Arsenault et al.

(10) Patent No.: US 6,493,795 B1
(45) Date of Patent: Dec. 10, 2002

(54) DATA STORAGE SYSTEM

(75) Inventors: Brian Arsenault, Leicester; Victor W. Tung, Shrewsbury; Jeffrey Stoddard Kinne, Needham, all of MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/223,417

(22) Filed: Dec. 30, 1998

(51) Int. Cl.$^7$ .............................................. G06F 12/00
(52) U.S. Cl. ..................... 711/114; 710/48; 710/305; 711/147; 711/154; 711/162
(58) Field of Search .................. 711/119, 120, 711/127, 112, 113, 114, 141, 147, 151, 154, 162; 710/27, 33, 35, 48, 305, 306, 308, 312, 313

(56) References Cited

U.S. PATENT DOCUMENTS

| | | | | |
|---|---|---|---|---|
| 4,654,819 A | * | 3/1987 | Stiffler et al. ............... | 711/162 |
| 4,819,154 A | * | 4/1989 | Stiffler et al. ................. | 714/20 |
| 5,206,939 A | * | 4/1993 | Yanai et al. .................. | 360/48 |
| 5,457,786 A | * | 10/1995 | Roush ......................... | 710/100 |
| 5,682,509 A | * | 10/1997 | Kabenjian ................... | 710/129 |
| 5,787,243 A | * | 7/1998 | Stiffler ........................ | 711/135 |
| 5,787,265 A | | 7/1998 | Leshem | |
| 5,819,054 A | | 10/1998 | Ninomiya et al. | |
| 5,838,891 A | * | 11/1998 | Mizuno et al. ................ | 714/5 |
| 5,864,657 A | * | 1/1999 | Stiffler ........................ | 711/135 |
| 5,887,270 A | * | 3/1999 | Brant et al. .................. | 711/162 |
| 5,895,485 A | * | 4/1999 | Loechel et al. ............. | 711/119 |
| 5,935,258 A | * | 8/1999 | Klein ........................... | 714/8 |
| 5,953,745 A | * | 9/1999 | Lattimore et al. .......... | 711/162 |
| 5,991,852 A | * | 11/1999 | Bagley ........................ | 711/112 |

* cited by examiner

Primary Examiner—Matthew Kim
Assistant Examiner—C. P. Chace
(74) Attorney, Agent, or Firm—Daly, Crowley & Mofford LLP

(57) ABSTRACT

A data storage system wherein a host computer is coupled to a bank of disk drives through a system interface. The interface includes a system memory comprising a pair of system memory sections. Each one of the system memory sections has a plurality of addressable locations for storing data written into such one of the memory sections at the addressable locations. A pair of system busses is provided, each one of the pair of system busses being coupled to a corresponding one of the pair of system memory sections. A plurality of directors is coupled to the system memory through the system bus. The directors are configured to control data transfer between the host computer and the bank of disk drives as such data passes through the system memory. The directors are configured to place the system in a dual-write mode, and in such mode, store therein a burst of the data to be transferred between the host computer and the bank of disk drives, transfer such stored burst of data sequentially to the pair of system busses, and enable both of the system memory sections coupled to such pair of system busses to have written therein, at the same one of the addressable locations, the same burst of data transferred sequentially to the pair of system busses.

9 Claims, 9 Drawing Sheets

DATA STORAGE SYSTEM

BACKGROUND OF THE INVENTION

This invention relates generally to data storage systems, and more particularly to data storage systems having redundancy arrangements to protect against total system failure in the event of a failure in a component or subassembly of the storage system.

As is known in the art, large mainframe computer systems require large capacity data storage systems. These large main frame computer systems generally includes data processors which perform many operations on data introduced to the computer system through peripherals including the data storage system. The results of these operations are output to peripherals, including the storage system.

One type of data storage system is a magnetic disk storage system. Here a bank of disk drives and the main frame computer system are coupled together through an interface. The interface includes CPU, or "front end", controllers (or directors) and "back end" disk controllers (or directors). The interface operates the controllers (or directors) in such a way that they are transparent to the computer. That is, data is stored in, and retrieved from, the bank of disk drives in such a way that the mainframe computer system merely thinks it is operating with one mainframe memory. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

As described in such U.S. Patent, the interface may also include, in addition to the CPU controllers (or directors) and disk controllers (or directors), addressable cache memories. The cache memory is a semiconductor memory and is provided to rapidly store data from the main frame computer system before storage in the disk drives, and, on the other hand, store data from the disk drives prior to being sent to the main frame computer. The cache memory being a semiconductor memory, as distinguished from a magnetic memory as in the case of the disk drives, is much faster than the disk drives in reading and writing data.

The CPU controllers, disk controllers and cache memory are interconnected through a backplane printed circuit board. More particularly, disk controllers are mounted on disk controller printed circuit boards. CPU controllers are mounted on CPU controller printed circuit boards. And, cache memories are mounted on cache memory printed circuit boards. The disk controller, CPU controller and cache memory printed circuit boards plug into the backplane printed circuit board. In order to provide data integrity in case of a failure in a controller, the backplane printed circuit board has a system bus made up of a pair of buses. One set the disk controllers is connected to one bus and another set of the disk controllers is connected to the other bus. Likewise, one set the CPU controllers is connected to one bus and another set of the CPU controllers is connected to the other bus. The cache memories are connected to both buses. Each one of the buses provides data, address and control information.

Thus, the use of two buses provides a degree of redundancy to protect against a total system failure in the event that the controllers, or disk drives connected to one bus fail. Further, the use of two buses increases the data transfer bandwidth of the system compared to a system having a single bus.

SUMMARY OF THE INVENTION

In accordance with the present invention, a data storage system is provided wherein a host computer is coupled to a bank of disk drives through an interface. The interface includes a system memory comprising a pair of system memory sections. Each one of the memory sections has a plurality of addressable locations for storing data written into such one of the memory sections at the addressable locations. A system bus is coupled to the pair of system memory sections. A plurality of directors is coupled to the system memory through the system bus, such directors being configured to control data transfer between the host computer and the bank of disk drives as such data passes through the system memory. The directors are configured to place the system in a dual-write mode, and in such mode, store therein a burst of the data to be transferred between the host computer and the bank of disk drives, transfer such stored burst of data sequentially to the system bus, and enable both of the memory sections coupled to such system bus to have written therein, at the same one of the addressable locations, the same burst of data transferred sequentially to the system bus.

In accordance with another feature of the invention, the interface includes a system memory having a pair of system memory sections. Each one of the system memory sections has a plurality of addressable locations for storing data written into such one of the memory sections at the addressable locations. A system bus comprising a pair of system busses is provided, each one of the pair of system busses being coupled to a corresponding one of the pair of system memory sections. A plurality of directors is coupled to the system memory through the system bus. The directors are configured to control data transfer between the host computer and the bank of disk drives as such data passes through the system memory. The directors are configured to place the system in a dual-write mode, and in such mode, store therein a burst of the data to be transferred between the host computer and the bank of disk drives, transfer such stored burst of data sequentially to the pair of system busses, and enable both of the system memory sections coupled to such pair of system busses to have written therein, at the same one of the addressable locations, the same burst of data transferred sequentially to the pair of system busses.

In accordance with another feature of the invention, during the dual-write mode, the directors store therein bursts of the data to be transferred between the host computer and the bank of disk drives. Each burst of data stored in the director is then transferred to one of the pair of system busses coupled to such director during one memory cycle and, during the next memory cycle, the same burst of data is then transferred again, but this time to the other one of the pair system busses coupled to such director. Thus, the same stored burst of data is transferred sequentially to both the pair of system busses coupled to such director. The director sequentially enables both of the memory sections coupled to both such pair of system busses to have written therein, at the same addressable locations, the same data burst which had been sequentiality transferred to each of the pair of system busses coupled to the director. Thus, after the pair of system memory cycles, the burst of data and a copy of such burst of data are stored in the same addressable location of both memory sections. Consequently, redundant data bursts are stored in the system memory.

In accordance with another feature of the invention, a dual-write bus is coupled to the plurality of directors. Each one of the directors includes: (a) a director memory for storing the burst of data fed thereto from the either the host computer or the bank of disk drives; and, (b) a dual-write controller. The dual-write controller is adapted to: (i) provide a dual-write interrupt on the dual-write bus in response to a dual-write mode command fed to the system; (ii) receive a dual-write interrupt produced on the dual-write bus; and (iii) in response to the dual-write interrupt received on the dual-write bus, sequentially place the burst of data stored in the director memory on the pair of system busses for sequential storage in both of the system memory sections at the same one of the addressable locations.

In accordance with still another feature of the invention, the system is adapted to return to a non-dual-write mode when each of the plurality of directors is reset to a non-dual-write mode in response to a reset condition provided to the system. When returned to the non-dual-write mode, each one of the directors is adapted to place the burst of data stored in the director memory on a selected one of the pair of system busses for storage of such stored data in the one of the system memory sections coupled to such selected one of the pair of system busses.

In accordance with yet another feature of the invention, each one of the directors is adapted to detect a fault in the transfer of the data between the director and each one of the pair of system memory sections. In response to a detected fault between the director and one of the pair of system memory sections, each one of the directors is adapted to force subsequent data transfers between the director and the other one of the pair of system memory sections.

BRIEF DESCRIPTION OF THE DRAWING

These and other features of the invention will become more readily apparent from the following detailed description when read together with the accompanying drawings, in which.

DESCRIPTION OF THE PREFERRED EMBODIMENTS

Figure 1A:
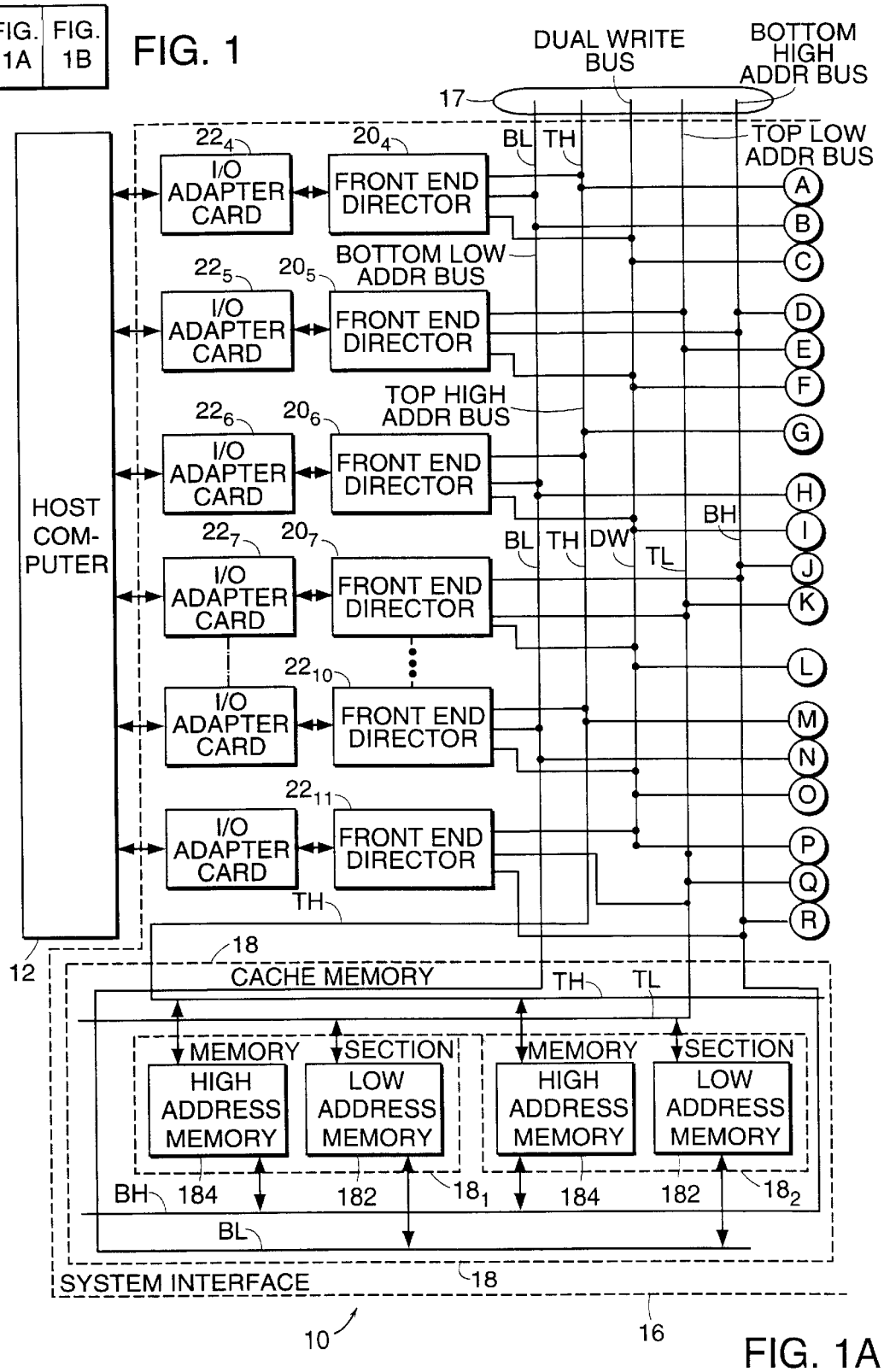
FIG. 1 is a data storage system adapted to operate in a dual-write mode or a non-dual write mode in accordance with the invention.
Figure 1B:
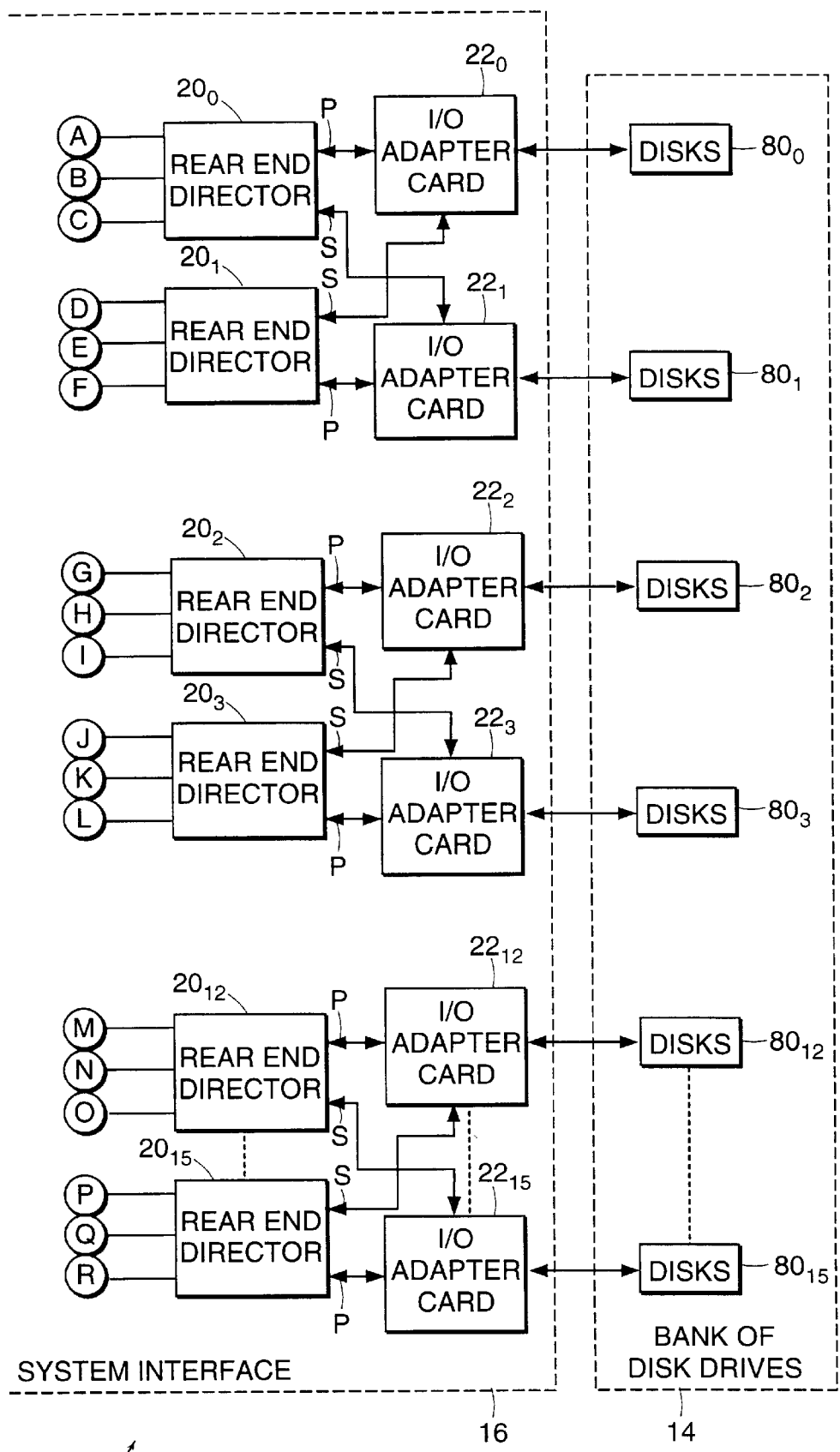

Referring now to FIG. 1, a data storage system 10 is shown wherein a host computer 12 is coupled to a bank 14 of disk drives through a system interface 16. The system interface 16 includes a system, or cache, memory 18, having a high address memory sections 18H and low address memory sections 18L. A plurality of directors $20_0$–$20_{15}$ is provided for controlling data transfer between the host computer 12 and the bank 14 of disk drives as such data passes through the system memory 18. The system 10 includes a system bus 17 comprising four system busses a top high address memory bus TH, a top low address memory bus TL, a bottom high address memory bus BH, and a bottom low address memory bus BL, described in more detail in co-pending patent application entitled "Data Storage System", inventors Daniel Castle, et al., filed on the same day as this application, assigned to the same assignee as the present invention, the entire subject mater thereof being incorporated herein by reference. More particularly, high address system busses TH, BH are electrically connected to the high address memory sections 18H. Low address system busses TL, BL are electrically connected to the low address memory sections 18L. Each one of the directors $20_0$–$20_{15}$ is coupled to a pair of the system busses; one bus being a high address bus and the other being a low address bus. Thus, each one of the directors $20_0$–$20_{15}$ is coupled to the pair of the system memory sections 18H and 18L.

Here, during a non-dual-write mode, the storage locations of the system memory 18 having the higher addresses are in the high address memory sections 18H and the storage locations having the lower addresses are in the low address memory sections 18L. It should be noted that each one of the directors $20_0$–$20_{15}$ is electrically connected to one of the pair of high address system busses TH, BH and one of the pair of low address system busses TL, BL. Thus, each one of the directors $20_0$–$20_{15}$ is able to address all locations in the entire system memory 18 (i.e., to both the high address memory sections 18H and the low address memory sections 18L) and is therefore able to store data in and retrieve data from any storage location in the entire system memory 18. While the system busses BH, BL, TH, TL provide data, addresses and memory control (i.e., write enable, read enable) to the memory 18, the system 10 also includes a dual-write control signal bus DW which is connected to all the directors, as indicated.

More particularly, a rear-end portion of the directors, here directors $20_0$–$20_3$ and $20_{12}$–$20_{15}$, is electrically connected to the bank 14 of disk drives through I/O adapter cards $22_0$–$22_3$ and $22_{12}$–$22_{15}$, respectively, and a front-end portion of the directors, here directors $20_4$–$20_{11}$, is electrically connected to the host computer 12 through I/O adapter cards $22_4$–$22_{11}$, respectively. It should also be noted that each end of the busses TH, TL, BH, BL is terminated with a pair of master and slave arbiters, not shown, described in detail in connection with the above-referenced co-pending patent application.

As will be described in detail hereinafter, the system 10 is adapted to operate in a number of modes. One mode is a non-dual-write mode, another mode is a dual-write mode, and still another mode is a forced HIGH/LOW mode. First, it should be noted that data to be transferred between the host computer 12 and the bank of disk drives 14 is transferred as a series of bursts of such data. Further, it should be noted that the directors $20_0$–$20_{15}$ store the bursts of the data being transferred between the host computer 12 and the bank of disk drives 14. During a non-dual-write mode, the stored burst of data is transferred by the director storing such data to one of the two system busses coupled thereto for temporary storage in the system memory 18. However, in the dual-write mode, the burst of data stored in the director is transferred sequentially to both of the busses coupled to such director. The directors enable both of the memory sections 18H and 18L coupled to both such busses to have written therein, at the same one of the addressable locations, the burst of data transferred sequentially to the bus. Thus, two copies of the same burst of data is stored in the pair of memory sections 18H, 18L for redundancy.

Further, each one of the directors $20_0$–$20_{15}$ is adapted to detect a fault in the transfer of the data between the director and the memory sections 18H and 18L. In response to a detected fault between the director and one of the pair of memory sections 18H, 18L, each one of the directors is adapted to force subsequent data transfers between the director and the other one of the pair of memory sections. Thus, considering director $20_4$ which is coupled to buses BL and TH, if such director is to transfer a burst of data stored therein to memory section 18H via system bus TH and a fault in such transferred is detected as with Error Detection and Correction (EDAC) or "time-out" circuitry (not shown) in the memory section 18H or director $20_4$, such director $20_4$ the system 10 is placed by such director $20_4$ in the forced HIGH/LOW mode, to be described. More particularly, in this example, the director $20_4$ forces all transfers of bursts of the data to the other memory connected thereto, here memory section 18L via system bus BL until the fault is corrected.

Considering now the general operation of system, 10, when the host computer 12 wishes to store data, the host computer 12 issues a write request to one of the front-end directors $20_4$–$20_{11}$ to perform a write command. One of the front-end directors $20_4$–$20_{11}$ replies to the request and asks the host computer 12 for the data. After the request has passed to the requesting one of the front-end directors $20_4$–$20_{11}$, the director determines the size of the data and reserves space in the system memory 18 to store the request. The front-end director then produces control signals to arbitrate for the given bus on either a high address memory system bus (TH or BH) or a low address memory system bus (TL, BL) connected to such front-end director depending on the location in the system memory 18 allocated to store the data and enable the transfer to the system memory 18. The host computer 12 then transfers the data, as bursts of data, to the front-end director. The front-end director then advises the host computer 12 that the transfer is complete. The front-end director looks up in a Table, not shown, stored in the system memory 18 to determine which one of the rear-end directors $20_0$–$20_3$ and $20_{12}$–$20_{15}$ is to handle this request. The Table maps the host computer 12 address into an address in the bank 14 of disk drives. The front-end director then puts a notification in a "mail box" (not shown and stored in the system memory 18) for the rear-end director which is to handle the request, the amount of the data and the disk address for the data. Other rear-end directors poll the system memory 18 when they are idle to check their "mail boxes". If the polled "mail box" indicates a transfer is to be made, the rear-end director processes the request, addresses the disk drive in the bank, reads the data from the system memory 18 and writes it into the addresses of a disk drive in the bank 14. When data is to be read from the bank 14 of disk drives to the host computer 12 the system 10 operates in a reciprocal manner.

As noted briefly above, the directors $20_0$–$20_{15}$ are configured to place the system 10 in a dual-write mode. In such dual-write mode, the directors $20_0$–$20_{15}$ store therein bursts of the data to be transferred between the host computer 12 and the bank 14 of disk drives. Each burst of data stored in the director is then transferred to one of the pair of system busses coupled to such director during one memory cycle and, during the next memory cycle, the same burst of data is then transferred again, but this time to the other one of the pair of system busses coupled to such director. Thus, the same stored burst of data is transferred sequentially to both pairs of system busses coupled to such director. The director sequentially enables both of the memory sections 18H and 18L coupled to both such pair of system busses to have written therein, at the same addressable locations, the same data burst which had been sequentiality transferred to each of the pair of system busses coupled to the director. For example, considering director $20_4$, during the dual-write mode, a data burst from the host computer 12 passes to such director $20_4$ and becomes stored in such director $20_4$. The stored data burst is then transferred to the system bus BL along with an address into which such data burst is to be written into memory section 18L, for example, during a system memory cycle. During the next system memory cycle, the same burst of data is transferred to system bus TH with the same addressable location used to for storage in memory sections 18L. Thus, during the second memory cycle, the same burst of data is stored in memory section 18H at the same addressable location as the burst of data was stored in memory section 18L. Thus, after the pair of system memory cycles, the burst of data and a copy of such burst of data are stored in the same addressable location of both memory sections 18H and 18L. Consequently, redundant data bursts are stored in the system memory 18.

Figure 2:
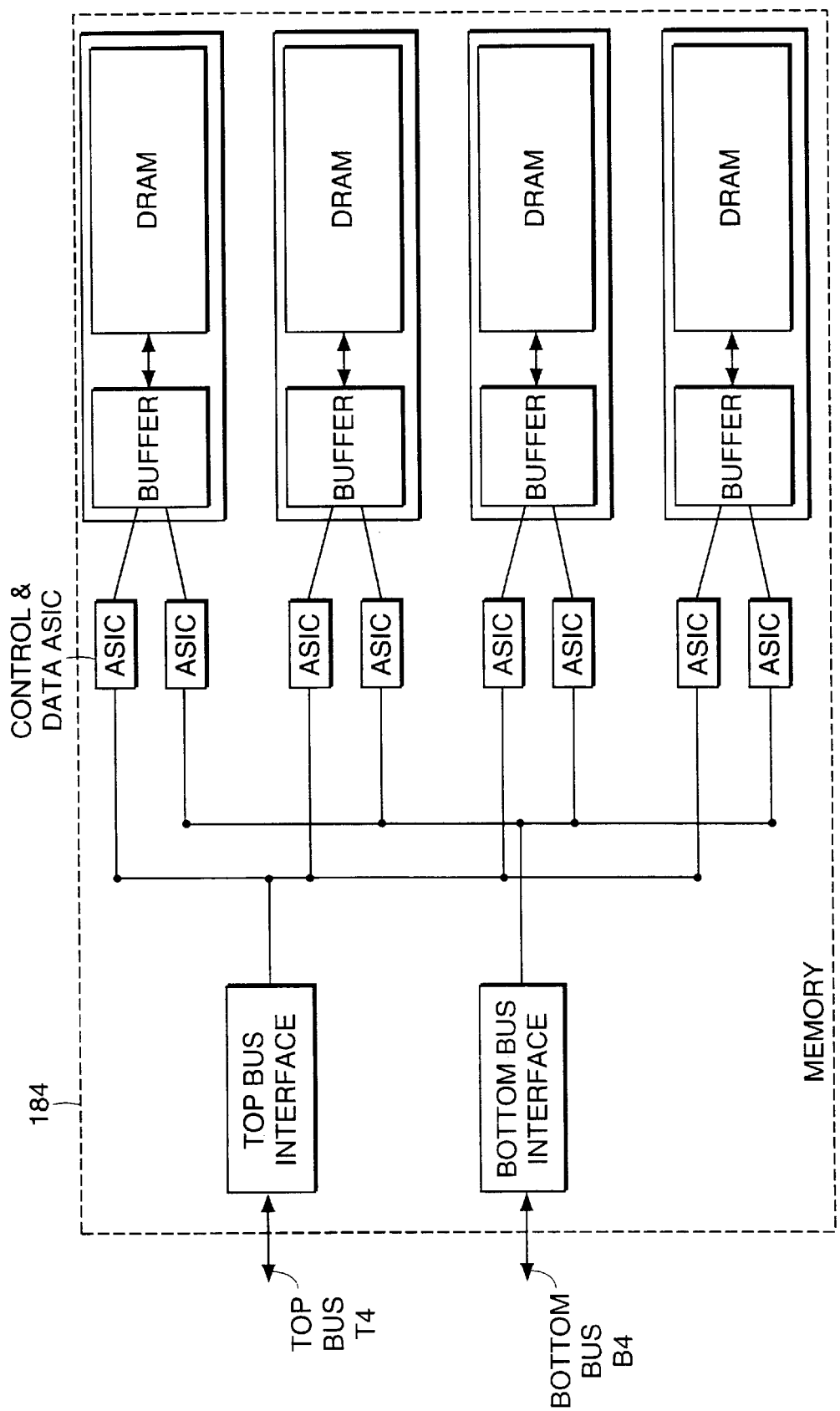
FIG. 2 is a block diagram of an exemplary memory adapted for use in the system of FIG. 1.

An exemplary one of the memory sections, 18H, 18L, here section 18H, is shown in FIG. 2 to include a plurality of here four DRAM sections coupled to top and bottom busses though bus interfaces and ASIC control logic, as indicated.

Figure 3:
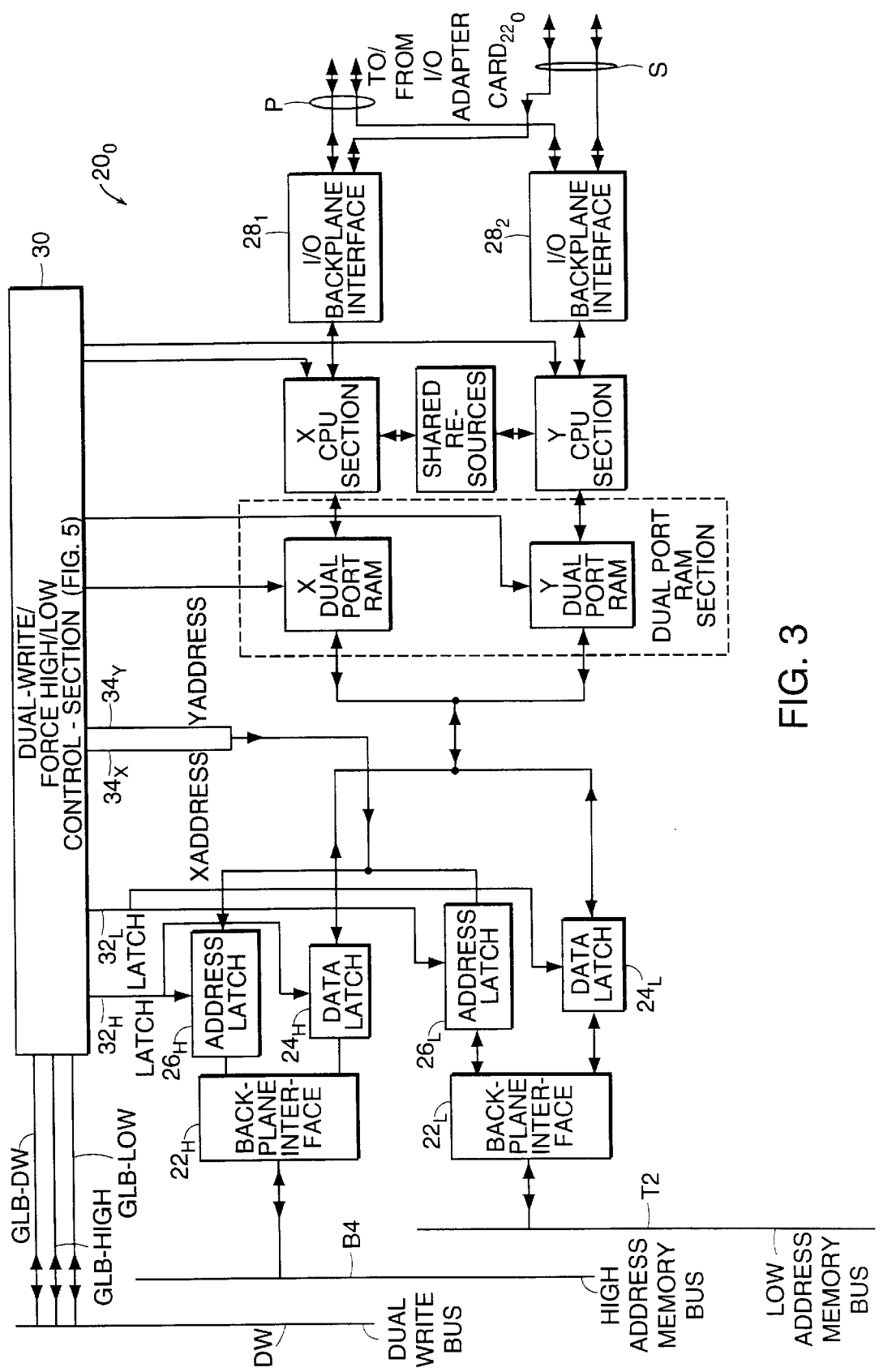
FIG. 3 is a block diagram of a rear-end director according to the invention, such director being adapted for use in the system of FIG. 1.
Figure 5:
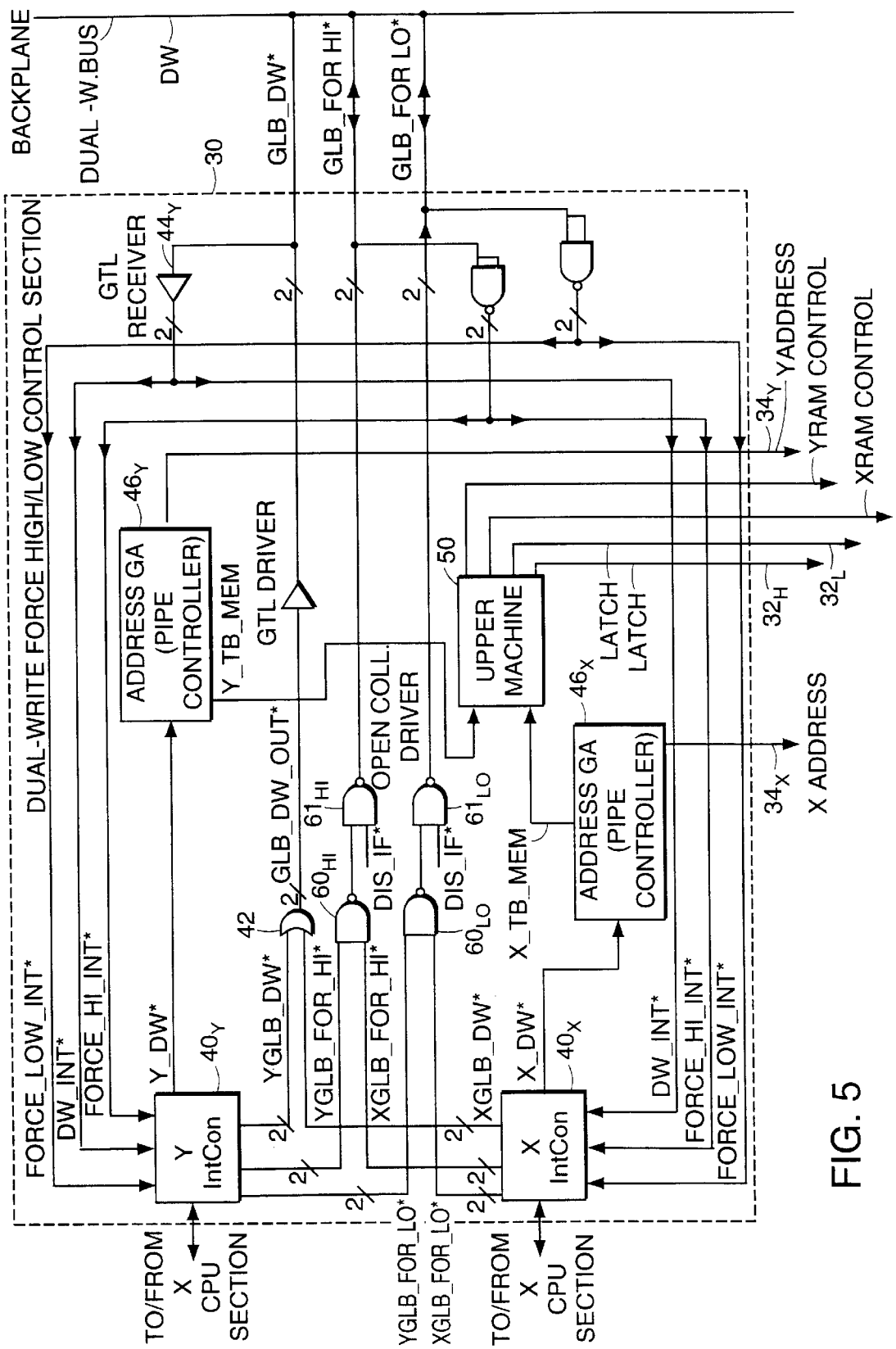
FIG. 5 is a block diagram of a dual-write force HIGH/LOW controller according to the invention and adapted for use in the front-end and rear-end directors of FIGS. 3 and 4.
Figure 6:
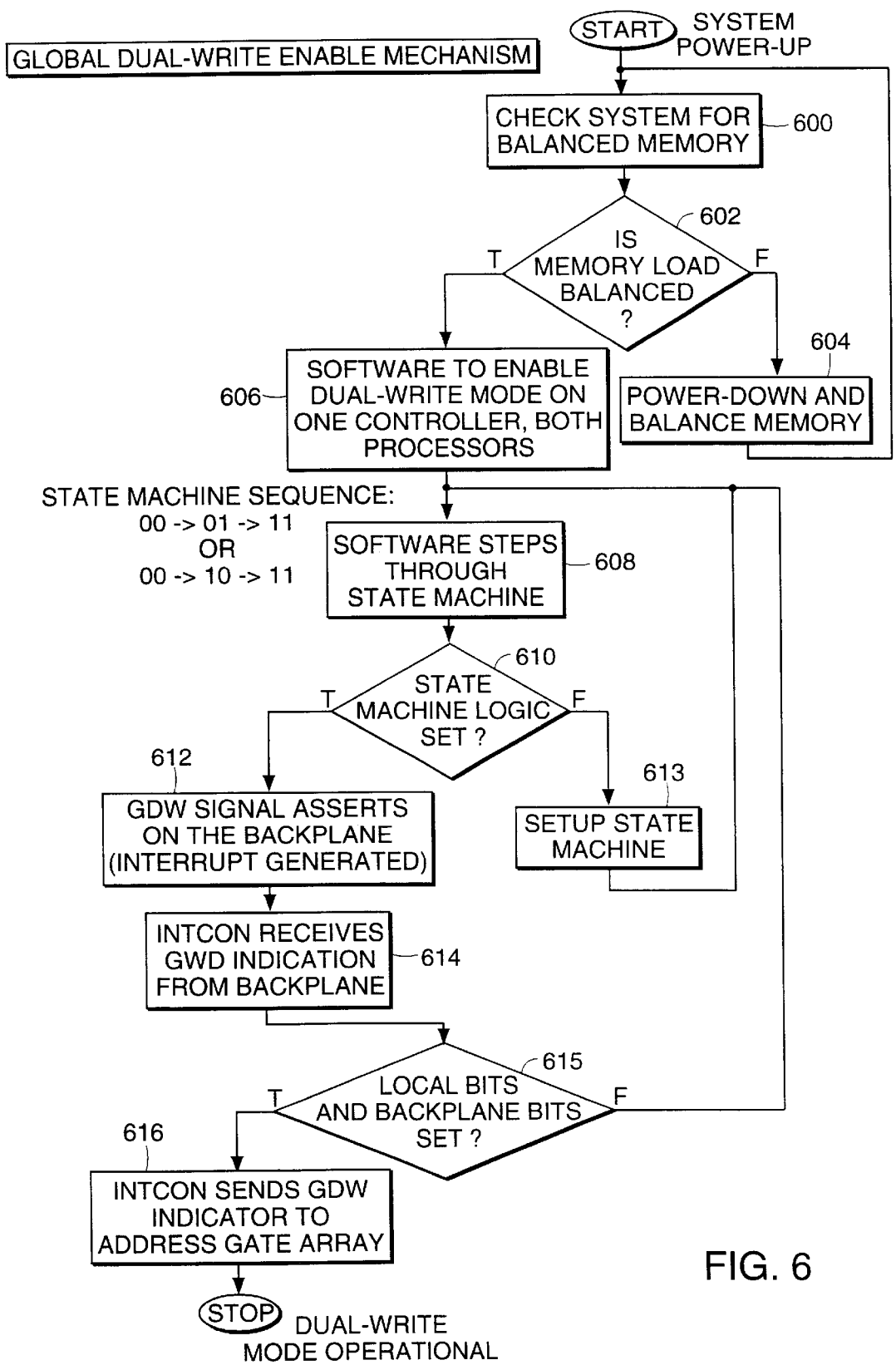
FIG. 6 is a flow diagram of a program stored in the directors of FIGS. 3 and 4, such program being adapted to place the system of FIG. 1 in a dual-write mode.
Figure 7:
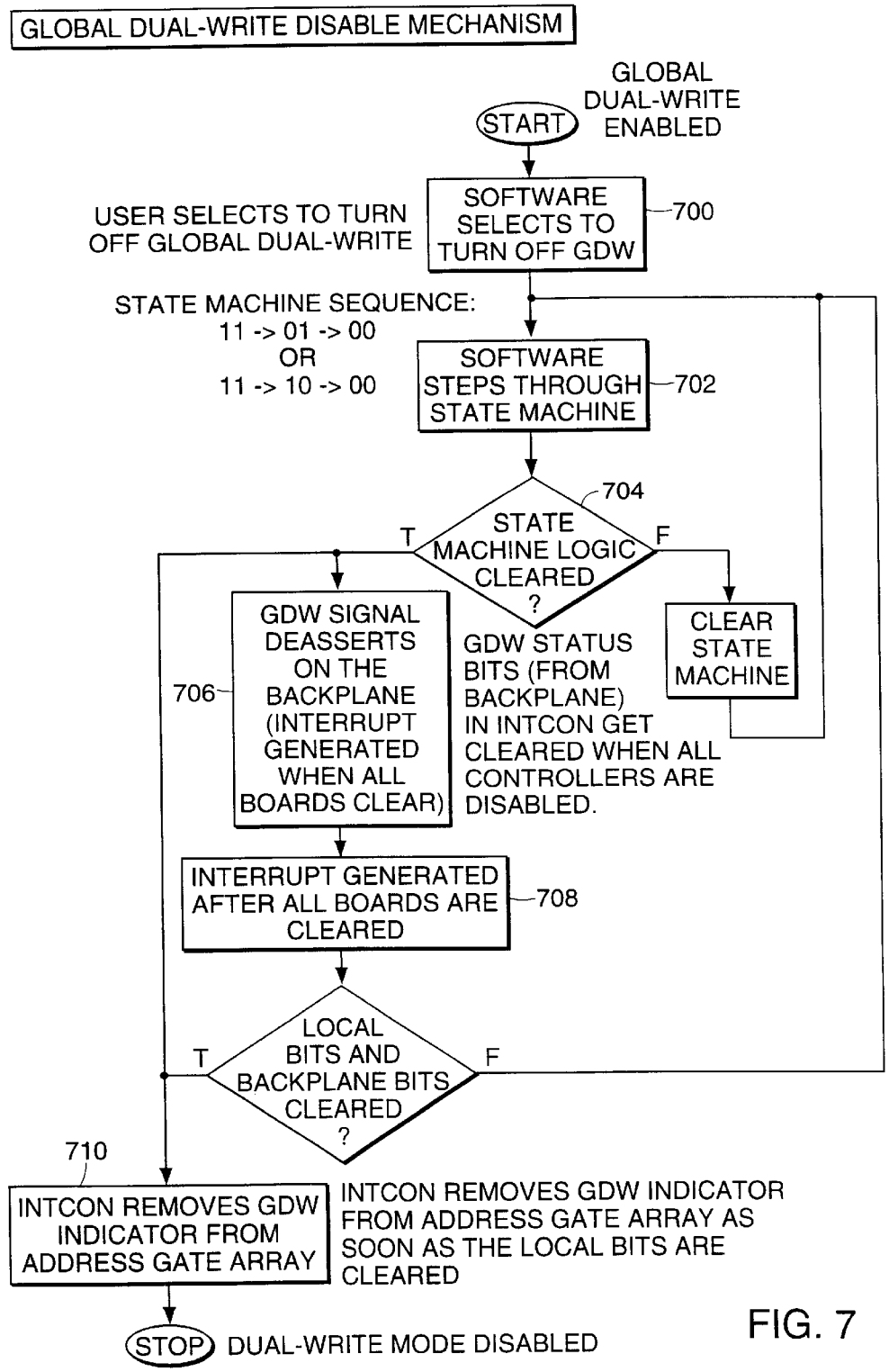
FIG. 7 is a flow diagram of a program stored in the directors of FIGS. 3 and 4, such program being adapted to reset the system of FIG. 1 from the dual-write mode to a non-dual write mode.
Figure 8:
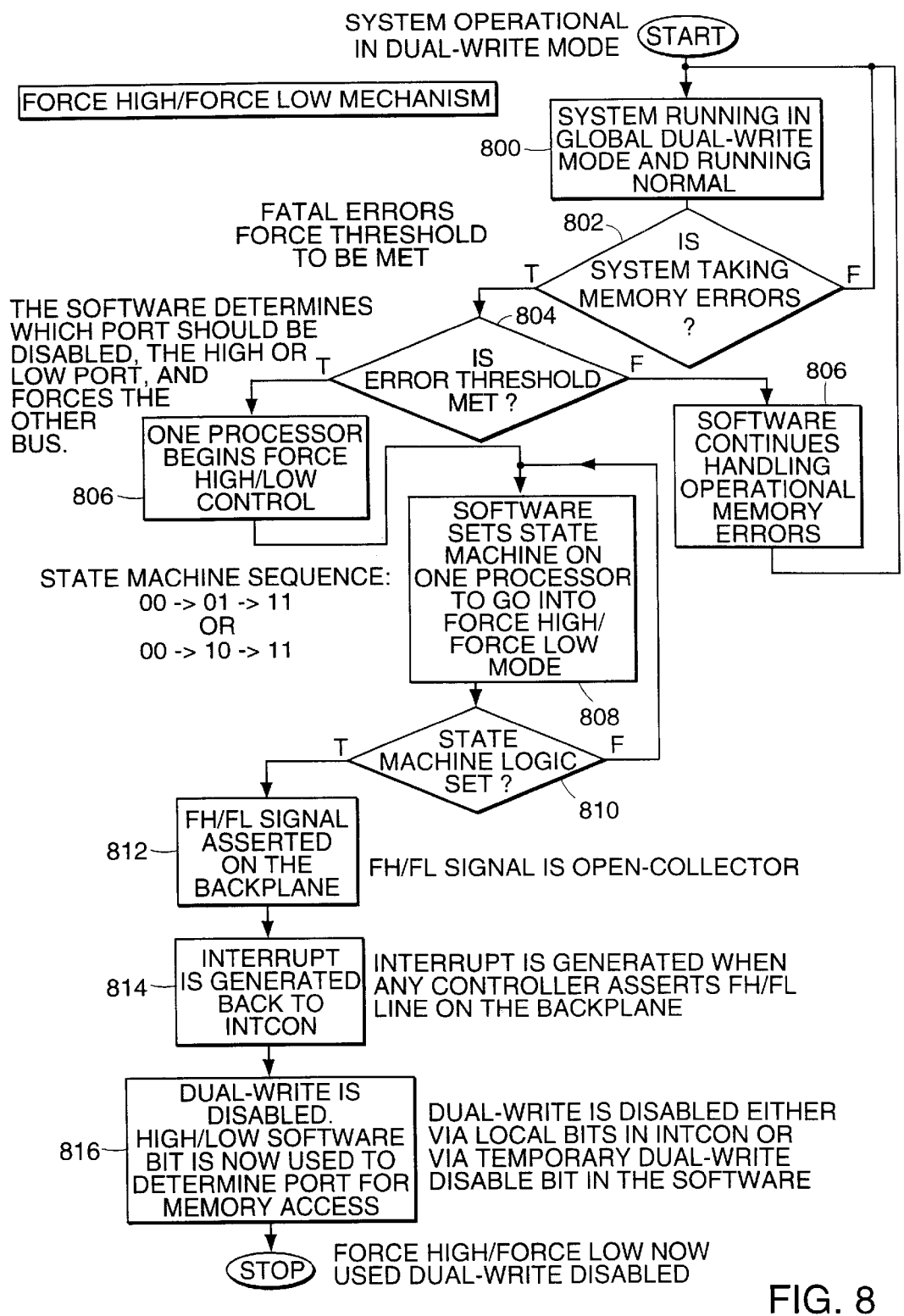
FIG. 8 is a flow diagram of a program stored in the directors of FIGS. 3 and 4, such program being adapted to place the system of FIG. 1 in a forced HIGH/LOW mode.

Each one of the rear-end portion of the directors $20_0$–$20_3$ and $20_{12}$–$20_{15}$ is identical in construction, an exemplary one therefor, here rear-end director 200 being shown in FIG. 3 to include a pair of central processing sections, CPU X and CPU Y, a dual port random access memory (RAM) section for storing the bursts of data and which includes a dual port RAM Y coupled to the Y CPU and a dual port RAM X coupled to the X CPU, shared resources (Flash memories, for, among other things, storage of programs the flow diagrams some of which are shown in FIGS. 6, 7 and 8, etc.), a pair of backplane interfaces 22H, 22L, a pair of data latches 24H, 24L, a pair of address latches 26H, 26L, a pair of I/O backplane interfaces $28_1$, $28_2$, and a dual-write force HIGH/LOW control section 30 (to be described in detail in connection with FIG. 5) all arranged as shown. The X and Y CPU sections are coupled to the bank 14 of disk drives (FIG. 1) through I/O adapter card 220 (FIG. 1) via an I/O backplane section interface $28_1$, $28_2$, as indicated. It should be noted that the director has a primary output port, P, and a secondary output port, S. As described in detail in connection the above-referenced co-pending patent application, the primary port P is connected to both I/O backplane interface $28_1$ and I/O backplane interface $28_2$. Likewise, the secondary port S is connected to both I/O backplane interface $28_2$ and I/O backplane interface $28_1$.

The dual port RAM section of director $20_0$ is coupled to: (1) a high address memory bus, here BH, through data latch 24H and backplane section interface 22H; and (2) a low address memory bus, here TL, through data latch 24L and backplane section interface 22L, as shown. Data (i.e., burst of data) are stored in the data latches 24H, 24L in response to latch signals fed thereto by the dual-write force HIGH/LOW control section 30 on lines 32H, 32L, respectively. As noted above, the dual-write/force memory HIGH/LOW control section 30 will be described in detail in connection with FIG. 5. Suffice it to say here, however, that such section 30 is adapted to: (i) provide a global dual-write interrupt (GLB_DW) on the dual-write bus DW in response to a dual-write mode command fed to the system 10; (ii) receive a global dual-write interrupt (GLB_DW) produced on the dual-write bus DW by another one of the directors $20_{1-2015}$ and (iii) in response to the global dual-write interrupt (GLB_DW) received on the dual-write bus DW, (either the GLB_DW it produced or the one produced by any one of the other directors), sequentially place the data burst stored in the dual port RAM on both of the system busses BH, TL connected to such director at the same addressable location. Here, sequentially place the data burst stored in the dual port RAM on both of the system busses BH and TL at the same addressable location, as described above. It should be understood that when the system 10 is not provided a dual-write mode command (i.e., the system 10 is in a non-dual-write mode), the section 30 is configured to that the burst data in the dual port RAM is placed on either one of the two system busses, here either BH or TL, with different addressable locations. Further, if the system 10 is placed in a dual-write mode, such section 30 is adapted to return to a non-dual-write mode when each of the plurality of directors $20_0$–$20_{15}$ is reset, in response to a reset condition provided to the system 10, to a non-dual write mode. Still further, as noted above, each one of the directors $20_0$–$20_{15}$ is adapted to detect a fault in the transfer of the data between the director and the memory sections 18H and 18L. In response to a detected fault between the director and one of the memory sections 18H, 18L, each one of the directors is adapted to force subsequent data transfers between the director and the other one of the memories. Thus, considering director 20$_4$ which is coupled to buses TL and BH, if such director is to transfer a burst of data stored therein to memory section 18H via bus BH and a fault in such transferred is detected as with EDAC or "time-out" circuitry, in the memory section 18H or director 20$_4$, the system 10 is placed by such director 20$_4$ in the force HIGH/LOW mode. More particularly, in this example, the director 20$_4$ forces all transfers of burst data to the other memory connected thereto, here memory section 18L via bus TL until the fault is corrected.

More particularly, in the dual-write mode, latch enable signals are produced by the control section 30 sequentially on lines 32H and 32L. That is, during one memory cycle, a latch enable signal is produced on, for example, line 32H and during the next memory cycle a latch enable signal is produced on line 32L in such example. In response to such latch enable signals, the burst of data in the dual port RAM is stored, in this example, sequentially into data latches 24H and 24L, respectively. Further, in the dual-write mode, the latch signals on lines 32H, 32L latch a common address on either bus 34X or bus 34Y into address latches 26H or 26L. The address latched into latches 26H and 26L provide the same address location in the system memory 18 where such data burst is to be stored. It is noted that when the burst of data from the dual port RAM is latched into data latch 24H and the address for such latched burst of data is latched into address latch 26H during one memory cycle by the latch enable signal on line 32H, such latched burst of data along with its address pass though the backplane interface 32H to the high address memory system bus BH, in this example. Likewise, in this example, during the next memory cycle, the same burst of data from the dual port RAM is latched into data latch 24L and the address for such burst of data is latched into address latch 26L by the latch enable signal on line 32L, such latched burst of data along with its address pass though the backplane interface 32L to the low address memory system bus TL, in this example. Thus, the burst of data being transferred from the dual port RAM for storage on the system memory 18 is here first placed on the bus BH, for example, via data latch 24H and backplane interface 22H during one memory cycle and then placed on bus TL via data latch 24L and backplane interface 22L during the next memory cycle.

Each one of the front-end portion of the directors $20_4$–$20_{11}$ is identical in construction and is substantially the same as the rear-end directors described above in connection with FIG. 3. Thus, an exemplary one thereof, here director 20$_4$ is shown in detail in FIG. 4 with equivalent elements being designated with the same numerical designation as that used in FIG. 3. Thus, the exemplary front-end director 20$_4$ is shown to include a pair of central processing sections (i.e., CPU X and CPU Y), a dual port random access memory (RAM) section which includes a dual port RAM Y coupled to the Y CPU and a dual port RAM X coupled to the X CPU, shared resources (Flash memories, etc.), a pair of backplane interfaces 22H, 22L, a pair of data latches 24H, 24L, a pair of address latches 26H, 26L, a pair of I/O backplane interfaces $28_1$, $28_2$, and a dual-write force HIGH/LOW control section 30 (to be described in detail in connection with FIG. 5), all arranged as shown. The X and Y CPU sections are coupled to the host computer 12 (FIG. 1) through I/O adapter card 224 (FIG. 1) via an I/O backplane section interface $28_1$, $28_2$, as indicated.

As with the rear-end directors, the dual port RAM section is coupled to: (1) a high address memory bus, here TH, through data latch 24H and backplane section interface 22H; and (2) a bottom low address memory bus, here BL, through data latch 24L and backplane section interface 22L, as shown. Data (i.e., burst of data) are stored in the data latches 24H, 24L in response to latch signals fed thereto by the dual-write force HIGH/LOW control section 30 on lines 32H, 32L, respectively. As noted above, section 30 is adapted to: (i) provide a global dual-write interrupt (GLB_DW) on the dual-write bus DW in response to a dual-write mode command fed to the system 10; (ii) receive a global dual-write interrupt (GLB DW) produced on the dual-write bus DW by another one of the directors $20_1$–$20_{15}$ and (iii) in response to the global dual-write interrupt (GLB_DW) received on the dual-write bus DW (either the GLB_DW it produced or the one produced by any one of the other directors), sequentially place the data burst stored in the dual port RAM on both of the system busses connected to such director at the same addressable location. Here, sequentially place the data burst stored in the dual port RAM on both of the system busses TH and BL at the same addressable location. Further, if the system 10 is placed in a dual-write mode, such section 30 is adapted to return to a non-dual-write mode when each of the plurality of directors $20_0$–$20_{15}$ is reset, in response to a reset condition provided to the system 10, to a non-dual write mode. Still further, as noted above, each one of the directors $20_0$–$20_{15}$ is adapted to detect a fault in the transfer of the data between the director and the memory sections 18H and 18L. In response to a detected fault between the director and one of the memory sections 18H, 18L, each one of the directors is adapted to force subsequent data transfers between the director and the other one of the memory sections.

Referring now to FIG. 5, the dual-write/Force HIGH/LOW control section 30 is shown to include: a pair of dual-write interrupt controllers $40_x$, $40_y$ coupled to the X CPU section and Y CPU section respectively of the director having such control section 30. Each one of the controllers $40_x$, $40_y$ is identical in construction and is configured to: (i) provide a global dual-write interrupt YGLB_DW, XGLB_DW respectively in response to a dual-write mode command fed to the system 10 (FIG. 1) and (ii) receive a dual-write interrupt DW_INT produced on the dual-write bus DW either by the director having the control section 30 or any of the other directors. The XGLB_DW and YGLB_DW signals, here each being a two bit signal, are fed to an OR gate 42. The output of the OR gate 42 is a two bit signal GLB_DW_OUT which is fed to an GTL driver. The output of the GTL driver is the global dual-write signal GLB_DW and is fed to the other directors, via the dual write bus DW, and the director producing the GLB_DW signal via GTL receiver which produces the signal DW_INT for the pair of dual-write interrupt controllers $40_x$, $40_y$.

Figure 4:
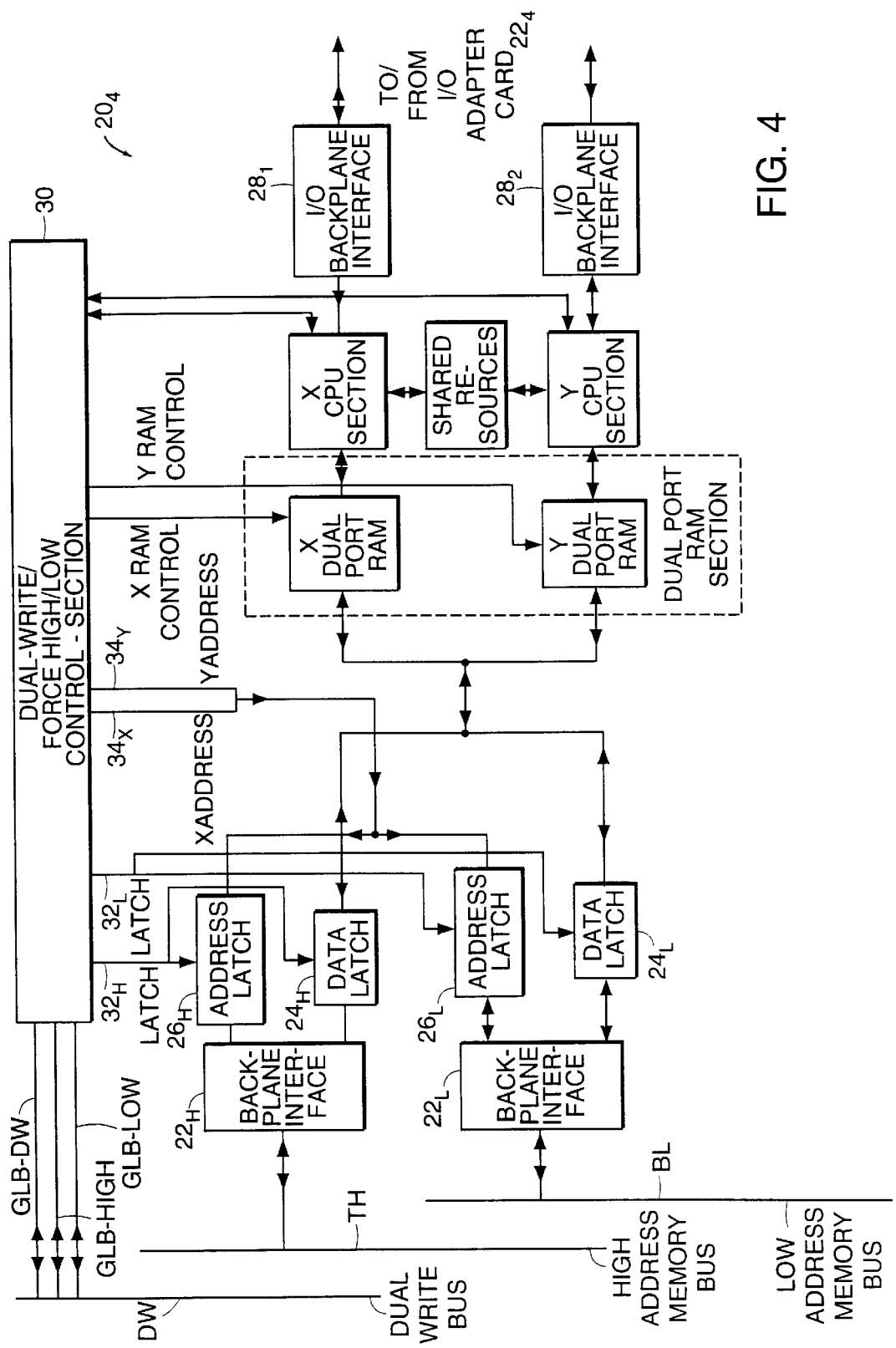
FIG. 4 is a block diagram of a front-end director according to the invention, such director being adapted for use in the system of FIG. 1.

The dual-write/Force HIGH/LOW control section 30 also includes a pair of address gate arrays $46_x$ and $46_y$ coupled to the X and Y interrupt controllers $40_x$, $40_y$, respectively, as shown. The pair of address gate arrays $46_x$ and $46_y$ provide the system memory 18 addresses for the bursts of data stored in the dual port RAM/ During the dual-write mode, a common address for each burst of data, as discussed above. The outputs of the address gate arrays $56_x$ and $64_y$ are fed to a logic section 50. The logic section 50 produces the latch signals on lines 32H, 32L and the X and Y DRAM control signals (e.g. read/write/address) for the DRAM section. The controllers $40_x$, $40_y$ provide addresses for the burst of data being coupled from the dual port DRAM section (FIGS. 3 and 4) to the data latches 24H, 24L on busses $34_x$ and $34_y$, respectively. Thus, the addresses provided by the pair of address gate arrays $46_x$ and $46_y$ on busses $34_x$ and $34_y$ are fed to the address latches 26H, 26L as shown in FIGS. 3 and 4, as discussed above. It is noted that the addresses on busses $34_x$, $34_y$ is latched into the address latches 26H and 26L selectively in accordance with the latch signals on lines 32H and 32L.

More particularly, during the dual-write mode, as noted above, the burst of data in the dual port RAM section is placed sequentially into data latches 24H and 24L. It should be noted that during the dual-write mode, when the burst of data is latched into data latch 24H, for example, an address for such data is latched into address latch 26H. Further, during the next system memory cycle when data is latched into latch 26L, the same address which had in the previous memory cycle had been latched into address latch 26H is latched into address latch 26L. During the non-dual-write mode, the address latched into the address latches 26H and 26L are independent from each other during successive memory cycles.

Referring now to FIG. 6, a flow diagram of a program stored in the directors $20_0$–$20_{15}$ is shown, such program being adapted to place the system 10 (FIG. 1) in the dual-write mode. Thus, at power-up (Step 600) the system 10 is checked to determine whether there is a balance in system memory 18 capacity between the high address memory section 18H and the low address memory section 18L (i.e, the sections have a memory capacity balance). If there is an imbalance detected, (Step 602) the system 10 is powered-down by the user (Step 604) and additional memory capacity is added to a memory capacity deficient one of the sections 18L or 18H.

After a balance in system memory 18 is detected, the users selects, if desired, a dual-write mode of operation. This mode is selected when the user wishes have redundant data in the system memory 18, i.e., the same burst of data in each of the memory sections 18L and 18H. Thus, in the event of a failure in one of the memory sections 18H or 18L and data is not properly transferred between the host computer 12 or bank of disk drives 14 (FIG. 1) and such one of the memory sections, the same burst of transferred data is available in the other one of the memory sections 18H, 18L. In order for the system to operate properly in the dual-write mode, each of the directors $20_0$–$20_{15}$ must know that the system 10 is being placed in the dual-write mode. Here, when any one of the directors $20_0$–$20_{15}$ detects that the user is placing the system in the dual-write mode, a signal is sent to both X and Y CPUs in such director (Step 606). In response to such signal, at a first subsequent system clock pulse the X and Y interrupt control sections $40_x$ and 40Y have a state machine register (not shown) change from an initial, reset, logic 0 state to a logic 1 on one of the two bits thereof. If such interrupt exists at the next system clock pulse, the state machine registers of both the X and Y interrupt control sections $40_x$ and $40_y$ have the second bit change from an initial logic 0 state to a logic 1 state. Thus, only if the dual-write request exists after the two system clock pulses will the state machine registers of both the X and Y interrupt control sections $40_x$ and $40_y$ produce a binary 00 logic condition on both busses XGLB_DW* and YGLB_DW*, respectively. (It is noted the logic is here "active" low logic indicated in FIG. 5 by the asterisk (*)) Only when this logic 00 condition is produced on busses XGLB_DW* and YGLB_DW* will the OR gate 42 produce a logic 00 condition on bus GLB_DW* (Steps 608, 610, 612), again in "active low" logic (Step 606). The logic 00 state on bus GLB_DW* is fed, via a GTL driver, to: the dual-write bus DW (FIG. 5) as a global dual-write signal, GLB_DW*; and back to the X and Y interrupt control sections $40_x$ and $40_y$ via a GTL receiver, as indicated in FIG. 5. The GLB_DW* signal indicates to this director, and all other directors, that a dual-write mode has been requested, i.e., a GLB_DW* signal has been asserted on the dual-write bus DW (Step 614, FIG. 6). As noted above, the GLB_DW*, 11 logic signal, on the dual-write is fed to the interrupt issuing one of the directors $20_0$–$20_{15}$ and all other directors $20_0$–$20_{15}$. Each one of the directors $20_0$–$20_{15}$ determines whether the state machine registers in the X and Y interrupt control sections $40_x$ and $40_y$ thereof is in the logic 00 condition. While the interrupt issuing one of the directors $20_0$–$20_{15}$ has the state machine registers thereof in the 00 logic condition, the other one of the issuing one of the directors $20_0$–$20_{15}$ must wait two system clock pulses before the state machines thereof are placed in the logic 00 condition (Step 613). Once all the directors $20_0$–$20_{15}$ are in the dual-write mode, as indicated by software status (Step 615) the interrupt control sections $40_x$ and $40_y$ send the global dual-write mode signal indication to the address gate array controllers $46_x$, $46_y$ (FIG. 5) (Step 616).

Referring now to FIG. 7, a flow diagram of a program stored in the directors $20_0$–$20_{15}$ is shown, such program being adapted to reset the system 10 (FIG. 1) from the dual-write mode to a non-dual-write mode. In response to a user command to reset (i.e., disable) the dual-write mode, the software enters the "turn off" global dual-write routine (Step 700). Interrupts are fed to the pair of Y and X interrupt controllers $40_x$, $40_y$ (FIG. 5, Step 702), and if after two system clock pulses the interrupt is proper (Step 704), the GLB_DW* signal on the dual-write bus DW is de-asserted (Step 706). Because the dual-write control sections 30 are wire-ORd on the dual-write bus DW, it is necessary for all controllers $20_0$–$20_{15}$ to have the GLB_DW* signal fed to the dual-write bus DW in a low, i.e., de-asserted logic state before all directors $20_0$–$20_{15}$ are placed in the reset). That is, the dual-write mode is disabled and the system 10 is placed in the non-dual-write mode, Step 708. In response to the de-assert signal from the dual-write bus DW (i.e., all directors $20_0$–$20_{15}$ produce a dual-write mode de-assert signal on the dual-write bus DW), the X. and Y interrupt controllers $40_x$, $40_y$ indicate to the address gate array controllers $46_x$, $46_y$ that the system 10 is now in the non-dual-write mode (Step 710).

Referring now to FIG. 8, a flow diagram is shown of a program stored in the directors $20_0$–$20_{15}$, such program being adapted to place the system 10 (FIG. 1) in a forced HIGH/LOW mode. Assume that the system 10 is operating normally in the dual-write mode (Step 800). The controller measure the number of faults, or "time-out" errors reported to them (Step 802). If none of the directors $20_0$–$20_{15}$ is having reported to it errors or "time-outs" in less than a predetermined number, the system continues in the dual-write mode (Step 804, 806). On the other hand, if one of the directors $20_0$–$20_{15}$ is having reported to it errors or "time-outs" in greater than the predetermined number, that director initiates the forced HIGH/LOW mode of operation for the system 10 (Step 806). As discussed above in connection with FIGS. 6 (Step 608) and 7 (Step 702), after the state machine registers of both the X and Y interrupt control sections $40_x$ and $40_y$ produce a binary 11 logic condition on busses either: (a) either busses XGLB_FOR_HI* and YGLB_FOR_HI*; or (b) either busses XGLB_FOR_LO and YGLB_FOR_LO*, respectively (Step 810), depending on whether the faults are with transfers to the high address memory bus or the low address memory bus (Step 810). (It is noted the logic is here "active" low logic indicated in FIG. 5 by the asterisk (*)) The signals on busses XGLB_FOR_HI* and YGLB_FOR_HI* are fed to NAND gate 60HI and the signals on busses XGLB_FOR_LO* and YGLB_FOR_LO* are fed to NAND gate 60LO. If the logic signals on either busses XGLB_FOR_HI* and YGLB_FOR_HI* indicate a force HI bus condition (i.e., there are excessive faults or time-outs to the low address memory section 18L). A GLB_FOR_HI* signal is produced (in "active" low logic) for the director issuing such signal and for the other directors $20_0$–$20_{15}$. Likewise, if the logic signals on either busses XGLB_FOR_LO* and YGLB_FOR_LO* indicate a force LO bus condition (i.e., there are excessive faults or time-outs to the low address memory section 18H), a GLB_FOR_HI* signal is produced (in "active" low logic) for the director issuing such signal and for the other directors $20_0$–$20_{15}$ (Step 812). It is noted that the NAND gates 60HI and 60LO are wire-ORd to the dual-write bus DW. It is also noted that the NAND gates 60HI and 60LO can have their outputs disabled via a user activated signal, DIS_IF*, which is fed to open collector drivers 61HI and 61LO, as indicated. Thus, an interrupt is generated when any one of the directors $20_0$–$20_{15}$ asserts a force high/low interrupt (i.e., either a GLB_FOR_LO* or GLB_FOR_HI* signal, FIG. 5 (Step 814). The directors $20_0$–$20_{15}$ are now in the force HIGH/LOW mode (i.e., dual-write mode is disabled) and the X and Y interrupt controllers $40_x$ and $40_y$ indicate to the address gate array controllers $46_x$ and $46_y$ where the force HIGH and\or FORCE LOW condition is selected. The address gate array controllers $46_x$ and $46_y$ then provide signals on the Y_TB_MEM* and X_TB_MEM* busses, respectively, to thereby enable the logic 50 to produce latch signals on lines 32H or 32L; the former being produced when in the force HIGH condition (i.e., excessive errors or time-outs to the low address memory section 18L) and the latter being produced when in the force LOW condition (i.e., excessive errors or time-outs to the high address memory section 18H), Step 816.

Other embodiments are within the spirit and scope of the appended claims.

What is claimed is:

1. A data storage system wherein a host computer is coupled to a bank of disk drives through an interface, such interface comprising:
   a system memory comprising a pair of system memory sections, each one of the memory sections having a plurality of addressable locations for storing data written into such one of the memory sections at the addressable locations;
   a system bus coupled to the pair of system memory sections;
   a plurality of directors coupled to the system memory through the system bus, such directors controlling data transfer between the host computer and the bank of disk drives as such data passes through the system memory; and
   wherein when the system is in a dual-write mode, one of the directors stores therein data to be transferred between the host computer and the bank of disk drives, transfers such stored data sequentially during a pair of system memory cycles to the system bus, and enables both of the memory sections coupled to such system bus to have written therein, at the same one of the addressable locations, the data transferred sequentially during the pair of system memory cycles to the system bus.

2. A data storage system wherein a host computer is coupled to a bank of disk drives through an interface, such interface comprising:
   (a) a system memory having a pair of system memory sections, each one of the system memory sections having a plurality of addressable locations for storing data written into such one of the memory sections at the addressable locations;
   (b) a pair of system busses each one of the system busses being coupled to a corresponding one of the pair of system memory sections;
   (c) a plurality of directors coupled to the system memory through the system busses, each one of such directors controlling data transfer between the host computer and the bank of disk drives as such data passes through the system memory; and
   (d) wherein when the system is placed in a dual-write mode one of the directors stores therein data to be transferred between the host computer and the bank of disk drives, and transfers such stored data sequentially during a pair of system memory cycles to the pair of busses, and enables both of the system memory sections coupled to such system pair of busses to have written therein, at the same one of the addressable locations, the data transferred sequentially during the pair of system bus cycles to the system busses for storage in both of the memory sections.

3. The system recited in claim 2 including a dual-write mode bus coupled to the plurality of directors, and wherein each one of the directors comprises:
   (a) a director memory for storing the data fed thereto from the host computer; and
   (b) a dual-write controller for:
      (i) providing a dual-write interrupt on the dual-write bus in response to a dual-write mode command fed to the system;
      (ii) receiving a dual-write interrupt produced on the dual-write bus; and (iii) in response to the dual-write interrupt received on the dual-write bus, sequentially placing, during the pair of system memory cycles, the data stored in the director memory on the pair of system busses for storage in both of the system memory sections at the same one of the addressable locations.

4. The system recited in claim 2 including a dual-write mode bus coupled to the plurality of directors, and wherein each one of the directors comprises:
  (a) a director memory for storing the data fed thereto from the host computer; and
  (b) a dual-write controller for:
    (i) providing a dual-write interrupt on the dual-write bus in response to a dual-write mode command fed to the system;
    (ii) receiving a dual-write interrupt produced on the dual-write bus;
    (iii) in response to the dual-write interrupt received on the dual-write bus, sequentially, during the pair of system memory cycles, placing the data stored in the director memory on the pair of system busses for storage in both of the system memory sections at the same one of the addressable locations on at least one of the system busses; and
    (iv) returning to a non-dual write mode when each of the plurality of directors is reset to a non-dual write condition in response to a reset condition provided to the system, and when in such non-dual write condition, placing the data stored in the director memory on a selected one of the pair of system busses for storage of such stored data in the one of the system memory sections coupled to such selected one of the pair of system busses.

5. The system recited in claim 3 wherein each one of the directors is adapted to detect a fault in the transfer of the data between the director and each one of the system memory sections, and in response to a detected fault between the director and one of the system memory sections, force subsequent data transfers between the director and the other one of the system memory sections.

6. A data storage system wherein a host computer is coupled to a bank of disk drives through an interface, such interface comprising:
  (a) system memory comprising a pair system memory sections, each one of the system memory sections having a plurality of addressable locations for storing data written into such one of the memory sections at the addressable locations;
  (b) a pair of system busses each one of the system busses being coupled to a corresponding one of the pair of system memory sections;
  (c) a plurality of directors coupled to the system memory through the system busses, such directors controlling data transfer between the host computer and the bank of disk drives as such data passes through the system memory; and
  (d) wherein when the system is placed in a forced system memory mode, when one of the pair of system busses fails, store in one of such directors data to be transferred between the host computer and the bank of disk drives, and transfer such stored data to only the other one of the system busses including a dual-write mode bus coupled to the plurality of directors, and wherein each one of the directors comprises:
    (a) a director memory for storing the data fed thereto from the host computer; and
    (b) a dual-write controller for:
      (i) providing a dual-write interrupt on the dual-write bus in response to a dual-write mode command fed to the system;
      (ii) receiving a dual-write interrupt produced on the dual-write bus; and
      (iii) in response to the dual-write interrupt received on the dual-write bus, sequentially, during a pair of system memory cycles, placing the data stored in the director memory on the pair of system busses for storage in both of the system memory sections at the same one of the addressable locations.

7. A data storage system wherein a host computer is coupled to a bank of disk drives through an interface, such interface comprising:
  (a) system memory comprising a pair system memory sections, each one of the system memory sections having a plurality of addressable locations for storing data written into such one of the memory sections at the addressable locations;
  (b) a pair of system busses each one of the system busses being coupled to a corresponding one of the pair of system memory sections;
  (c) a plurality of directors coupled to the system memory through the system busses, such directors controlling data transfer between the host computer and the bank of disk drives as such data passes through the system memory; and
  (d) wherein when the system is placed in a forced system memory mode, when one of the pair of system busses fails, store in one of such directors data to be transferred between the host computer and the bank of disk drives, and transfer such stored data to only the other one of the system busses including a dual-write bus coupled to the plurality of directors, and wherein each one of the directors comprises:
    (a) a director memory for storing the data fed thereto from the host computer; and
    (b) a dual-write controller for:
      (i) providing a dual-write interrupt on the dual-write bus in response to a dual-write mode command fed to the data storage system;
      (ii) receiving a dual-write interrupt produced on the dual-write bus; and
      (iii) in response to the dual-write interrupt received on the dual-write bus, sequentially, during the pair of memory cycles, placing the data stored in the director memory on the pair of system busses for storage in both of the system memory sections at the same one of the addressable locations.

8. A data storage system wherein a host computer is coupled to a bank of disk drives through an interface, such interface comprising:
  a system memory comprising a pair of system memory sections, each one of the memory sections having a plurality of addressable locations for storing data written into such one of the memory sections at the addressable locations;
  a system bus coupled to the pair of system memory sections;
  a plurality of directors coupled to the system memory through the system bus, such directors controlling data transfer between the host computer and the bank of disk drives as such data passes through the system memory; and wherein when the system is placed in a dual-write mode one of such directors stores therein bursts of the data to be transferred between the host computer and the bank of disk drives, each burst of data stored in the director then being transferred to one of a pair of system busses coupled to such one of the directors during one memory cycle and, during the next memory cycle, the same burst of data being then transferred to the other one of the pair of system busses coupled to such director, the same stored burst of data being transferred sequentially during a pair of system memory cycles to the pair of system busses and being stored in both of the memory sections at the same addressable locations.

9. A data storage system wherein a host computer is coupled to a bank of disk drives through an interface, such interface comprising:

a memory system having a pair of system memory sections;

a plurality of directors each one being coupled to the pair of memory sections, such directors controlling data transfer between the host computer and the bank of disk drives as such data passes through the system memory; and wherein when the system is in a dual-write mode, one of the directors stores therein data to be transferred between the host computer and the bank of disk drives and transfers such stored data sequentially to both of the memory sections.

* * * * *